United States Patent [19]

Itoh

[11] Patent Number: 5,744,887
[45] Date of Patent: Apr. 28, 1998

[54] PERMANENT MAGNET ROTOR AND MANUFACTURING METHOD THEREOF

[75] Inventor: Hiroshi Itoh, Takefu, Japan

[73] Assignee: Matsushita Electric Industrial Co., Ltd., Osaka-fu, Japan

[21] Appl. No.: 631,055

[22] Filed: Apr. 12, 1996

[30] Foreign Application Priority Data

Apr. 14, 1995 [JP] Japan .................................. 7-089733

[51] Int. Cl.$^6$ .............................. H02K 5/04; H02K 5/15; H02K 21/12
[52] U.S. Cl. ............................. 310/156; 310/88; 310/89; 310/91
[58] Field of Search ............................. 310/88, 89, 156, 310/91, 270, 217

[56] References Cited

U.S. PATENT DOCUMENTS 5,475,276  12/1995  Shiga et al. .......................... 310/154
5,486,730  1/1996  Ludwig et al. .......................... 310/156

FOREIGN PATENT DOCUMENTS 58-46856  3/1983  Japan .
8-219059  8/1996  Japan .................................. 310/156

Primary Examiner—Steven L. Stephan
Assistant Examiner—Tran N. Nguyen
Attorney, Agent, or Firm—Wenderoth, Lind & Ponack

[57] ABSTRACT

A permanent magnet rotor includes a rotor shaft, a yoke mounted on the rotor shaft to form a magnetic path, a plurality of permanent magnets secured to the outer surface of the yoke, and a non-magnetic metallic cylindrical cover mounted on the permanent magnets. The cylindrical cover has a plurality of axially equidistantly spaced grooves defined in the outer surface thereof so as to extend circumferentially thereof. The cylindrical cover may have a continuous spiral groove in place of the plurality of axially equidistantly spaced grooves.

6 Claims, 6 Drawing Sheets

PERMANENT MAGNET ROTOR AND MANUFACTURING METHOD THEREOF

BACKGROUND OF THE INVENTION

1. Field of the Invention

The present invention relates generally to a rotor used in a permanent magnet motor and, more particularly, to a permanent magnet rotor having a non-magnetic metallic cover mounted on permanent magnets. The present invention also relates to a method of manufacturing the permanent magnet rotor.

2. Description of Related Art

In these days, a system that has an inverter for driving a permanent magnet motor has been increasingly used for the purpose of energy savings. A permanent magnet rotor in the permanent magnet motor uses either a non-metallic cover or a metallic cover to hold permanent magnets.

The non-metallic cover is formed of, for example, glass binder or the like. Although the non-metallic cover of this kind nearly matches the metallic cover in terms of strength, the non-metallic cover has a temperature limit determined depending on an adhesive used. Accordingly, the non-metallic cover has the disadvantage that shrinkage fitting is impracticable to assemble the permanent magnet rotor, and bonding of a binder material takes much time.

On the other hand, the metallic cover is advantageously resistant to high temperatures and easy to process with a high productivity in comparison with the non-metallic cover. However, because of electrically-conductive properties of the material, the metallic cover produces an eddy current loss, which in turn reduces the efficiency of the motor.

Although a metallic material of low conductivity such as titanium or chromium can be used to reduce the eddy current loss, such a material is expensive and consequently impractical. Alternatively, the thickness of the metal may be decreased, which however lowers the strength for holding the permanent magnets.

To overcome these problems, Japanese Laid-Open Patent Publication (unexamined) No. 58-46856 discloses a permanent magnet rotor having a plurality of circumferentially equally spaced slits defined in a non-magnetic metallic cover to reduce the eddy current loss generated in the metallic cover.

This permanent magnet rotor will be described hereinafter with reference to FIGS. 11 and 12.

As shown in FIG. 11, the permanent magnet rotor comprises a rotor shaft 2, a yoke 3 mounted on the rotor shaft 2, a plurality of arcuated permanent magnets 4 secured to the yoke 3, and a non-magnetic metallic cylindrical cover 1e mounted on the permanent magnets 4 to hold the permanent magnets 4. The cylindrical cover 1e has a plurality of circumferentially equally spaced slits 9 defined therein to finely divide a path for an eddy current generated in the cylindrical cover 1e. As a result, the path for the eddy current is eventually lengthened as a whole, thus increasing the electric resistance and reducing the eddy current loss.

However, in the conventional construction as disclosed in Japanese Laid-Open Patent Publication No. 58-46856, because the slits 9 are formed in the cylindrical cover 1e, there is a good chance that fine broken pieces of permanent magnets 4 generated during assembling of the permanent magnet rotor will scatter out from the slits 9. The reason why the permanent magnets 4 become broken is that the permanent magnets 4 are assembled before being magnetized and are then magnetized with the use of a stator electrode upon completion of assembling to enhance the assembling efficiency. In other words, the permanent magnets 4 when assembled are in a relatively fragile state. Particularly, when the permanent magnet motor is used in a closed compressor, if the broken pieces of the permanent magnets 4 enter compression elements during assembling of the compressor, it is likely that the compression elements constituted with a clearance of several microns will be fatally locked by the fine broken pieces of the permanent magnets 4.

Moreover, as shown in FIG. 12, it is also likely that the slits 9 in the cylindrical cover 1e will be caught at outer peripheral corners 4a of the permanent magnets 4 when the cylindrical cover 1e is mounted on the permanent magnets 4 by shrinkage fitting or press fitting, resulting in improper fitting or assembling failures.

SUMMARY OF THE INVENTION

The present invention has been developed to overcome the abovedescribed disadvantages.

It is accordingly an objective of the present invention to provide an improved permanent magnet rotor which generates a lesser eddy current loss.

Another objective of the present invention is to provide the permanent magnet rotor of the above-described type which is easy to assemble and is less susceptible to breakdown.

A further objective of the present invention is to provide a method of manufacturing the permanent magnet rotor.

In accomplishing the above and other objectives, the permanent magnet rotor according to the present invention comprises a rotor shaft, a yoke mounted on the rotor shaft to form a magnetic path, a plurality of permanent magnets secured to an outer surface of the yoke, and a non-magnetic metallic cylindrical cover mounted on the permanent magnets and having a groove means defined in an outer surface thereof so as to extend generally circumferentially thereof.

Advantageously, the groove means is in the form of a plurality of axially spaced and circumferentially extending grooves.

Alternatively, the groove means is in the form of a continuous spiral groove having a plurality of convolutions each extending generally circumferentially of the non-magnetic metallic cylindrical cover.

Although it is likely that a portion of the permanent magnets will be broken when the rotor is assembled, the cylindrical cover prevents fine broken pieces from scattering outside.

Because the cylindrical cover has a smooth inner surface, the cylindrical cover can be easily fitted onto the permanent magnets by shrinkage fitting or press fitting, and assembling failures are eliminated. Furthermore, because a path for an eddy current generated in the cylindrical cover is finely divided, the path is lengthened as a whole, resulting in an increase in electric resistance and a reduction in eddy current loss.

The non-magnetic metallic cover may be formed of a non-magnetic metallic strip wound spirally around the permanent magnets in an overlapping manner.

This non-magnetic metallic cover is relatively easy to process as compared with the shrinkage fitting or press fitting, thus eliminating assembling failures.

The permanent magnet rotor may be provided with a first non-magnetic metallic cylindrical cover mounted on the permanent magnets and a plurality of axially spaced second non-magnetic metallic cylindrical covers mounted on the first non-magnetic metallic cylindrical cover so as to define a plurality of gaps each between the neighboring second non-magnetic metallic cylindrical covers. In this case, the first cylindrical cover has an axial length equal to or slightly longer than that of the permanent magnets.

The relatively long first cylindrical cover acts to prevent fine broken pieces of the permanent magnets from scattering outside. Because the first cylindrical cover has a smooth inner surface, the first cylindrical cover is easily shrinkage-fitted or press-fitted onto the permanent magnets, thus eliminating assembling failures. Moreover, the provision of the plurality of relatively short second cylindrical covers on the first cylindrical cover offers a sufficient strength required as a non-magnetic metallic cylindrical cover.

Advantageously, the first cylindrical cover has a thickness smaller than that of the second cylindrical covers. By so doing, the electric resistance of the thin first cylindrical cover is increased to thereby reduce the eddy current loss. At the same time, because the thick second cylindrical covers are mutually spaced a distance, the eddy current path is finely divided to thereby increase the electric resistance and decrease the eddy current loss.

In another aspect of the present invention, a method of manufacturing a permanent magnet rotor comprises the steps of: mounting a yoke on a rotor shaft to form a magnetic path; securing a plurality of permanent magnets to an outer surface of the yoke; forming a plurality of axially spaced grooves in an outer surface of a non-magnetic metallic cylindrical member to provide a non-magnetic metallic cylindrical cover; and shrinkage- or press-fitting the non-magnetic metallic cylindrical cover onto the permanent magnets.

In a further aspect of the present invention, a method of manufacturing a permanent magnet rotor comprises the steps of: mounting a yoke on a rotor shaft to form a magnetic path; securing a plurality of permanent magnets to an outer surface of the yoke; preparing a non-magnetic metallic plate of a rectangular shape; forming a plurality of grooves in one surface of the non-magnetic metallic plate so as to extend in a direction perpendicular to a longitudinal direction of the non-magnetic metallic plate, the plurality of grooves being spaced in the longitudinal direction of the non-magnetic metallic plate; forming the non-magnetic metallic plate into a cylindrical member so that the plurality of grooves extend circumferentially of the cylindrical member in an outer surface thereof; welding opposed ends of the cylindrical member; cutting the cylindrical member into a plurality of non-magnetic metallic covers each having a predetermined length; and shrinkage- or press-fitting one of the plurality of non-magnetic metallic covers onto the permanent magnets.

This manufacturing method enhances the productivity of the non-magnetic metallic cylindrical covers.

Conveniently, the grooves are formed so as to extend in a direction perpendicular to the rolling direction when the non-magnetic metallic plate is rolled, so that the manufacturing cost may be further reduced.

In a still further aspect of the present invention, a method of manufacturing a permanent magnet rotor comprises the steps of: mounting a yoke on a rotor shaft to form a magnetic path; securing a plurality of permanent magnets to an outer surface of the yoke; forming a continuous spiral groove in an outer surface of a non-magnetic metallic cylindrical member to provide a non-magnetic metallic cylindrical cover; and shrinkage- or press-fitting the non-magnetic metallic cover onto the permanent magnets.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

Figure 1:
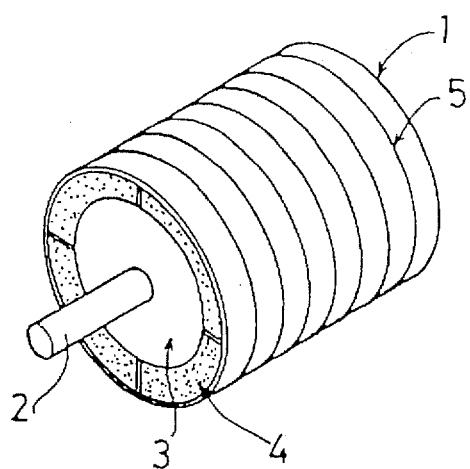
FIG. 1 is a perspective view of a permanent magnet rotor according to a first embodiment of the present invention.

Referring now to the drawings, there is shown in FIG. 1 a permanent magnet rotor according to a first embodiment of the present invention.

As shown in FIG. 1, the permanent magnet rotor comprises a rotor shaft 2, a yoke 3 mounted on the rotor shaft 2 to form a magnetic path in the rotor, a plurality of arcuated permanent magnets 4 secured to the outer surface of the yoke 3, and a non-magnetic metallic cylindrical cover 1 mounted on the permanent magnets 4 to hold them on the yoke 3. The cylindrical cover 1 has a plurality of axially equidistantly spaced grooves 5 defined therein so as to extend circumferentially thereof.

Figure 3:
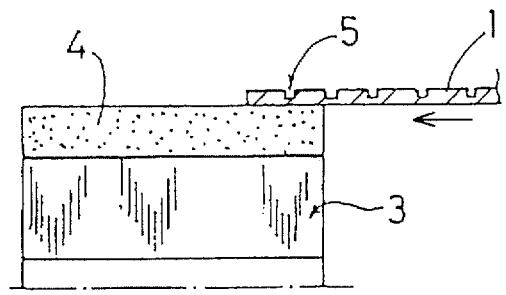
FIG. 3 is a schematic sectional view showing how to fit a non-magnetic metallic cylindrical cover onto permanent magnets.
Figure 11:
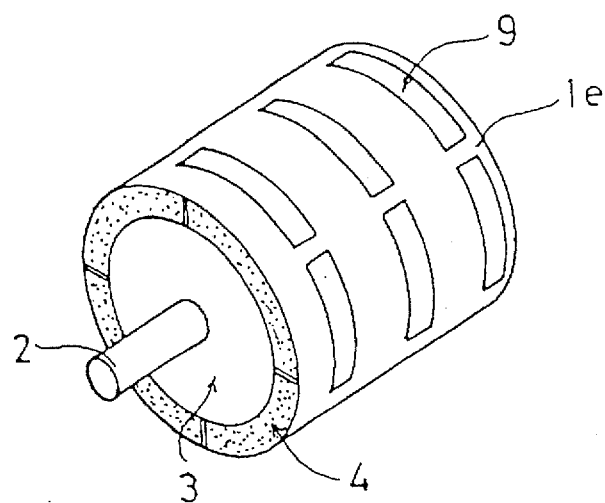
FIG. 11 is a perspective view of a conventional permanent magnet rotor.
Figure 12:
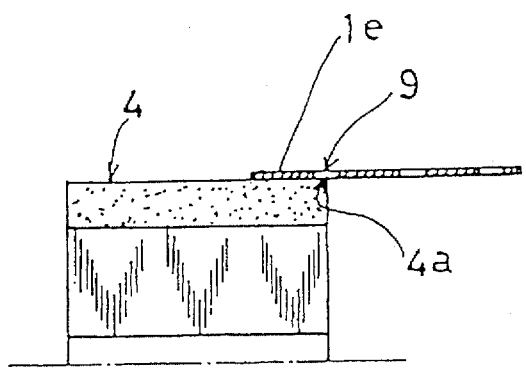
FIG. 12 is a schematic sectional view of the conventional permanent magnet rotor of FIG. 11, showing how to fit a non-magnetic metallic cylindrical cover onto permanent magnets.

In the above-described structure, because a path for an eddy current generated in the cylindrical cover 1 is finely divided by the circumferential grooves 5 of the cylindrical cover 1, the path for the eddy current becomes long as a whole, resulting in an increase in electric resistance and a reduction in eddy current loss. Furthermore, because the cylindrical cover 1 does not have the slits as shown in FIG. 11, fine broken pieces of the permanent magnets 4, which are likely generated during assembling of the rotor, are prevented from scattering outside. The absence of the slits in the cylindrical cover 1 facilitates shrinkage fitting or press fitting of the cylindrical cover 1 onto the arcuated permanent magnets 4 in a direction of an arrow shown in FIG. 3, because the circumferentially grooves 5 are formed in only the outer surface of the cylindrical cover 1, the inner surface of which is maintained smooth.

Figure 2:
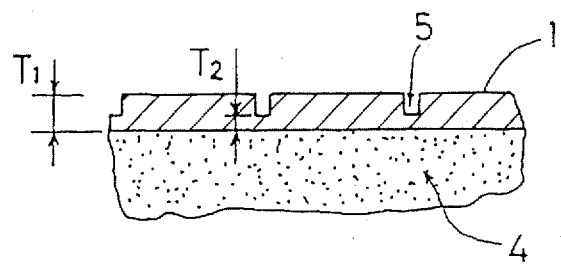
FIG. 2 is a sectional view of an essential portion of the permanent magnet rotor of FIG. 1.

In FIG. 2, the thickness $T_2$ of a bottom wall of the circumferential grooves 5 is desired to be as small as possible to enhance an effect of reducing the eddy current loss. With the processability and assembling efficiency taken into consideration, if the thickness of the cylindrical cover 1 is $T_1$, it is preferred that the value of $T_2/T_1$ ranges from 0.1 to 0.5. It is needless to say that this value varies depending on the size of the permanent magnet rotor and the thickness $T_1$ of the cylindrical cover 1 and is, therefore, not limited to the above range. In addition, the axial distance or interval of the grooves 5 has a large influence on the effect of reducing the eddy current loss, and the effect is enhanced as the axial distance is made smaller. However, the axial distance of the grooves 5 is determined to offer a good balance of the processability and productivity.

Various methods are utilizable to form the circumferential grooves in the cylindrical cover 1.

When a non-magnetic metallic pipe is used for the cylindrical cover 1, a metallic core is first inserted thereinto and is subsequently held by a holder of a lathe so that plastic working or the like may be applied to the non-magnetic metallic pipe with the use of a tool.

Figure 4:
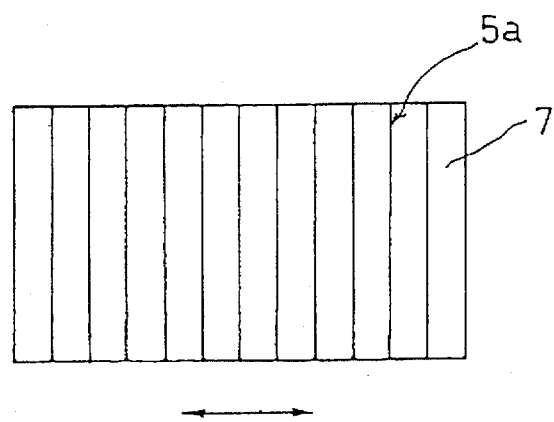
FIG. 4 is a top plan view of a non-magnetic metallic plate used to obtain the non-magnetic metallic cylindrical cover.
Figure 5:
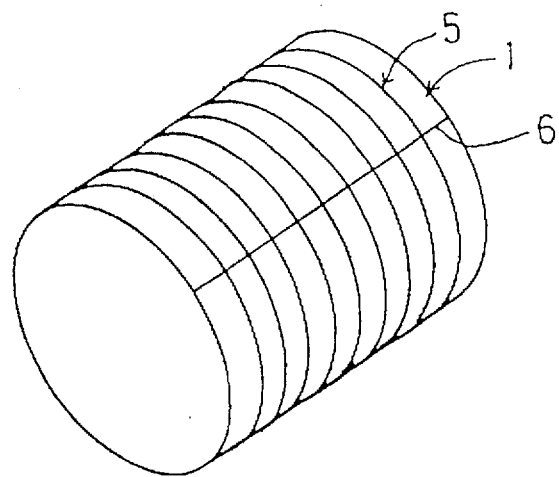
FIG. 5 is a perspective view of the non-magnetic metallic cylindrical cover obtained from the non-magnetic metallic plate of FIG. 4.

Alternatively, as shown in FIG. 4, a plurality of grooves 5a may be formed in one surface of a non-magnetic metallic plate 7 of a rectangular shape so as to extend in a direction perpendicular to the longitudinal direction of the non-magnetic metallic plate 7. The plurality of grooves 5a are spaced at a predetermined pitch in a rolling direction thereof indicated by an arrow, which direction coincides, in the illustrated embodiment, with the longitudinal direction of the non-magnetic metallic plate 7. The non-magnetic metallic plate 7 is then formed into a cylindrical shape with the grooves 5a directed outward, and opposed ends 6 of the cylindrical member thus formed are then welded, as depicted in FIG. 5. This is a general practice when a pipe is produced by shaping a coil strip into a cylinder and welding opposed ends thereof. According to this method, a plurality of non-magnetic metallic cylindrical covers 1 can be manufactured by cutting the cylindrical member to predetermined lengths.

Figure 6:
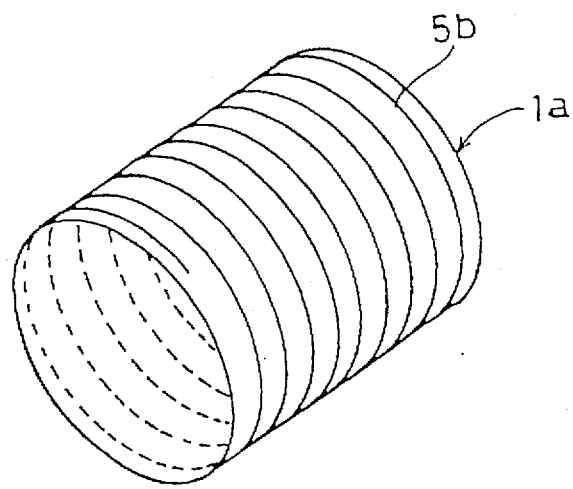
FIG. 6 is a perspective view of a non-magnetic metallic cylindrical cover mounted on a permanent magnet rotor according to a second embodiment of the present invention.

FIG. 6 depicts a non-magnetic metallic cylindrical cover 1a which is to be mounted on a permanent magnet rotor according to a second embodiment of the present invention.

The cylindrical cover 1a shown in FIG. 6 has a continuous spiral groove 5b defined in the outer surface thereof and having a plurality of convolutions each extending generally circumferentially of the cylindrical cover 1a. When a non-magnetic metallic pipe is used for the cylindrical cover 1a, a metallic core is first inserted thereinto and is subsequently held by a holder of a lathe so that the spiral groove 5b may be formed by plastic working or the like manner with a tool pressed to the non-magnetic metallic pipe.

While the non-magnetic metallic cylindrical cover 1 according to the first embodiment of the present invention has a plurality of axially spaced circumferential grooves 5 or 5a, the non-magnetic metallic cylindrical cover 1a according to the second embodiment of the present invention has a continuous spiral groove 5b, which is a sole difference from the first embodiment. Accordingly, the description of the other elements is omitted for brevity's sake.

Figure 7:
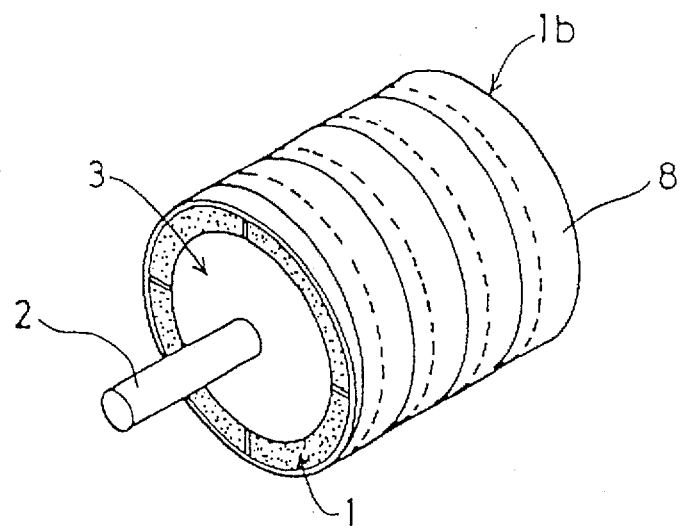
FIG. 7 is a perspective view of a permanent magnet rotor according to a third embodiment of the present invention.
Figure 8:
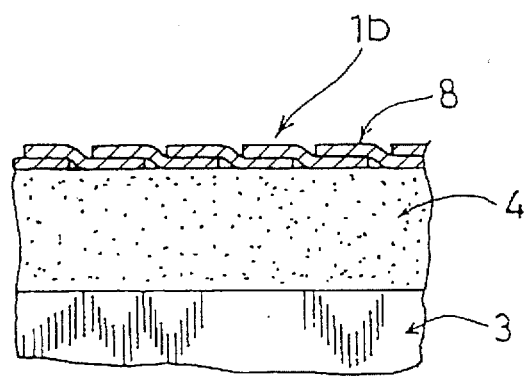
FIG. 8 is a sectional view of an essential portion of the permanent magnet rotor of FIG. 7.

FIGS. 7 and 8 depict a permanent magnet rotor according to a third embodiment of the present invention.

As shown therein, the permanent magnet rotor comprises a rotor shaft 2, a yoke 3 mounted on the rotor shaft 2 to form a magnetic path in the rotor, a plurality of arcuated permanent magnets 4 secured to the outer surface of the yoke 3, and a non-magnetic metallic strip 8 wound spirally around the permanent magnets 4 in an overlapping manner to form a generally cylindrical non-magnetic metallic cover 1b.

According to the third embodiment of the present invention, because the generally cylindrical cover 1b is formed by spirally winding the metallic strip 8 around the permanent magnets 4 in the overlapping manner, the generally cylindrical cover 1b prevents minute broken pieces of the permanent magnets 4 from scattering outside. Moreover, because the path for the eddy current is finely divided by the generally cylindrical cover 1b, the electric resistance is increased and the eddy current loss is reduced.

Figure 9:
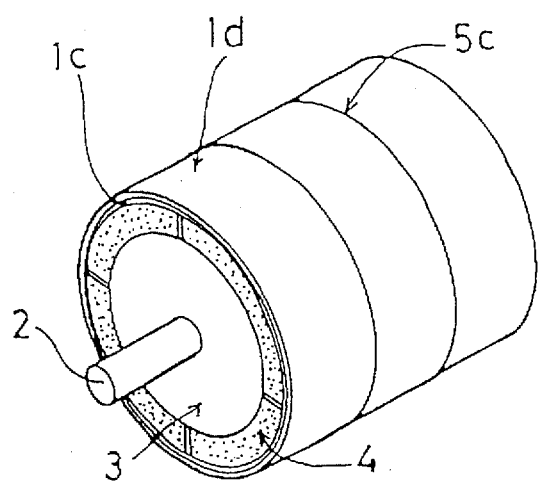
FIG. 9 is a perspective view of a permanent magnet rotor according to a fourth embodiment of the present invention.
Figure 10:
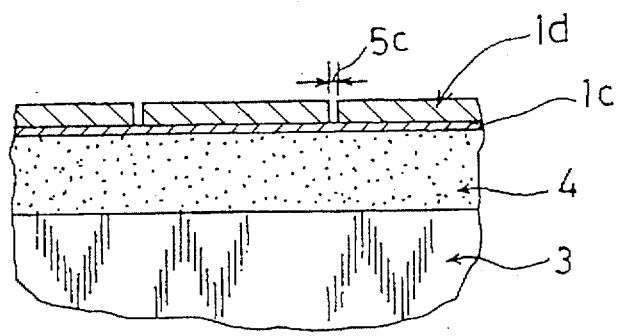
FIG. 10 is a sectional view of an essential portion of the permanent magnet rotor of FIG. 9.

FIGS. 9 and 10 depict a permanent magnet rotor according to a fourth embodiment of the present invention.

As shown in FIGS. 9 and 10, the permanent magnet rotor comprises a rotor shaft 2, a yoke 3 mounted on the rotor shaft 2 to form a magnetic path in the rotor, and a plurality of arcuated permanent magnets 4 secured to the outer surface of the yoke 3. The permanent magnet rotor shown in FIGS. 9 and 10 further comprises a non-magnetic metallic cylindrical cover 1c mounted on the permanent magnets 4 to hold them on the yoke 3, and a plurality of non-magnetic metallic cylindrical covers 1d mounted on the cylindrical cover 1c.

The lower cylindrical cover 1c is relatively thin and is intended to prevent scattering of fine broken pieces of the permanent magnets 4 generated during assembling of the rotor. To this end, the lower cylindrical cover 1c has a length equal to or slightly longer than the axial length of the permanent magnets 4. On the other hand, the upper cylindrical covers 1d are intended to reinforce the mechanical strength of the lower cylindrical cover 1c, and are spaced from each other with a gap 5c defined between the neighboring upper cylindrical covers 1d. The total thickness of the lower cylindrical cover 1c and one of the upper cylindrical covers 1d is substantially equal to the thickness of the cylindrical cover 1 of the first embodiment.

In the above-described arrangement, fine broken pieces of the permanent magnets 4 are prevented from scattering outside by the relatively long lower cylindrical cover 1c. Because the long lower cylindrical cover 1c is made thinner than the axially spaced short upper cylindrical covers 1d, the former has a large electric resistance, which reduces the eddy current loss. At the same time, the gap 5c defined between the neighboring upper cylindrical covers 1d finely divides an eddy current path, resulting in an increase in electric resistance and a reduction in eddy current loss. Also, because the lower cylindrical cover 1c has a smooth inner surface, it is easy to fit the cylindrical cover 1c onto the permanent magnets 4 without any assembling failures.

According to the present invention, the non-magnetic metallic cover or covers of the permanent magnet rotor perfectly satisfies the features not ever realized by the prior art. In other words, the eddy current loss in the non-magnetic metallic cover or covers is reduced, the assembling efficiency is improved owing to the smooth inner surface of the non-magnetic metallic cover, and fine pieces of the permanent magnets resulting from the breakage of the permanent magnets when the permanent magnet rotor is assembled are prevented from scattering outside. Accordingly, the present invention is effective to provide an improved permanent magnet rotor which is accompanied with a lesser eddy current loss and fewer failures, and is easy to assemble.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A permanent magnet rotor comprising:

a rotor shaft;

a yoke mounted on said rotor shaft to form a magnetic path;

a plurality of permanent magnets secured to an outer surface of said yoke;

a non-magnetic metallic cylindrical cover mounted on said permanent magnets and having at least one groove defined in an outer surface thereof so as to extend generally circumferentially thereof; and wherein said at least one groove opens in a radially outward direction and is closed at a radially inner part thereof so as to block any broken pieces of said permanent magnets from escaping radially outwardly through said annular cover.

2. The permanent magnet rotor according to claim 1, wherein said at lest one groove comprises a plurality of axially spaced and circumferentially extending grooves.

3. The permanent magnet rotor according to claim 1, wherein said at least one groove comprises a continuous spiral groove having a plurality of convolutions each extending generally circumferentially of said non-magnetic metallic cylindrical cover.

4. A permanent magnet rotor according to claim 11, wherein said non-magnetic metallic cover is formed of a non-magnetic metallic strip wound spirally around said permanent magnets in an overlapping manner.

5. A permanent magnet rotor comprising:

a rotor shaft;

a yoke mounted on said rotor shaft to form a magnetic path;

a plurality of permanent magnets secured to an outer surface of said yoke;

a first non-magnetic metallic cylindrical cover mounted on said permanent magnets and having an axial length equal to or slightly longer than that of said permanent magnets;

a plurality of axially spaced apart second non-magnetic metallic cylindrical covers mounted on said first non-magnetic metallic cylindrical cover so as to define a plurality of gaps respectively between neighboring pairs of said second non-magnetic metallic cylindrical covers; and wherein said gaps open in a radially outward direction and are closed at radially inner parts thereof by said first non-magnetic metallic cylindrical cover so as to block any broken pieces of said permanent magnets from escaping radially outwardly through said gaps.

6. The permanent magnet rotor according to claim 5, wherein said first non-magnetic metallic cylindrical cover has a thickness smaller than that of each of said second non-magnetic metallic cylindrical covers.

* * * * *